United States Patent Office 2,763,691
Patented Sept. 18, 1956

2,763,691

PROCESS FOR PRODUCTION OF 2,4,5-TRI-HYDROXYACETOPHENONE

M B Knowles, Kingsport, Tenn., assignor to Eastman Kodak Company, Rochester, N. Y., a corporation of New Jersey No Drawing. Application August 21, 1952, Serial No. 305,701

6 Claims. (Cl. 260—592)

This invention relates to a new and improved process for preparing 2,4,5-trihydroxyacetophenone. This process can be represented schematically as follows:

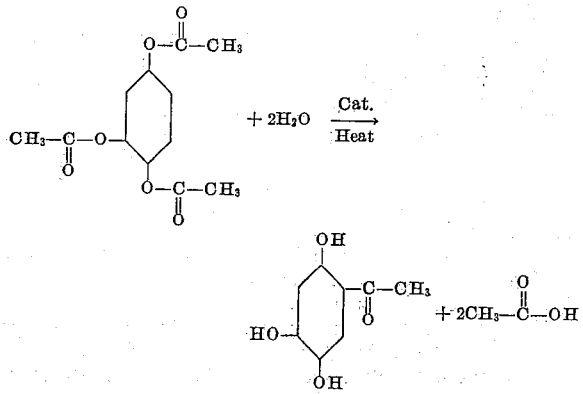

The product obtained is useful as an antioxidant for fats and oils. Certain compositions and processes relating to this antioxidant are covered in a copending application by Bell, Knowles and Tholstrup, Serial No. 302,412, filed on August 2, 1952

It is an object of this invention to provide a new, improved and highly useful process for preparing trihydroxyacetophenones. Other objects will become apparent hereinafter.

Instead of starting with 1,2,4-triacetoxybenzene as indicated above, p-quinone can be reacted with acetic anhydride whereby the above starting material can be prepared and simultaneously or immediately thereafter converted in the presence of water or an alcohol to 2,4,5-trihydroxyacetophenone. Advantageously, the conversion of p-quinone is conducted in the presence of an acid catalyst.

It is not known that acidic catalysts of the type described hereinbelow have ever been used in such a Fries rearrangement in which water was present. Rosemund and Schnurr, Ann., 460, 56 (1928) have reported that sulfuric, phosphoric or camphor-sulfonic acid reverse the Fries reaction in certain instances. Mauthner, J. Prakt. Chem., 136, 213 (1933) used aluminum chloride as the catalyst and Healey and Robinson, J. Chem. Soc. 1934, p. 1625, used zinc chloride for this reaction. Neither of these investigators used any water.

The new and improved process which has been developed involves the conversion of 1,2,4-triacetoxybenzene into 2,4,5-trihydroxyacetophenone by a first stage comprising simultaneous partial hydrolysis and rearrangement under the influence of an acidic catalyst and in the presence of a limited quantity of water (or a lower aliphatic alcohol), followed by a completion of the hydrolysis. For maximum yield, the quantity of water or alcohol must be present in the initial stage in an amount which is from about an equimolecular to about twice the molecular quantity of the 1,2,4-trihydroxybenzene; however, the addition of quantities larger than this does not seem to be either helpful nor detrimental once the first stage of the reaction has reached substantial completion.

The acidic catalysts which can be advantageously employed include aromatic sulfonic acids, cycloalkyl sulfonic acids, sulfuric acid and zinc chloride. When employing sulfuric acid as the catalyst, it is advantageous to do so in the presence of acetic anhydride. Other acidic catalysts besides those mentioned can also be employed. The water required in accordance with this new process can be present in association with the catalyst as illustrated in Examples 1, 2 and 3 below.

The reaction can be advantageously carried out at a temperature of from about 80° C. to about 160° C.; the optimum temperature is advantageously in the range of from about 120° C. to about 160° C. Most advantageously, a temperature of about 135° C. can be employed.

The reaction can be carried out for a period of time which can be advantageously varied from about 10 minutes to about 30 minutes; however, periods of time from 1 minute to about 60 minutes can also be employed. Longer and shorter periods of time will produce correspondingly less advantageous results.

The proportion of acidic catalyst which can be advantageously employed to a certain extent depends upon the specific catalyst being employed. When sulfonic acid is employed in the process starting with 1,2,4-triacetoxybenzene, it is advantageous to employ from about 0.01 to about 0.75 part by weight of the sulfonic acid for each part by weight of 1,2,4-triacetoxybenzene; most advantageously, from about 0.01 to about 0.03 part by weight can be employed.

When employing sulfuric acid as the catalyst, starting with p-quinone, it is advantageous to employ from about 0.015 to about 0.20 parts by weight of the sulfuric acid for each part by weight of p-quinone; it is especially advantageous to employ from about 0.04 to about 0.12 part by weight of the sulfuric acid for each part by weight of the p-quinone (in some instances about 0.08 part by weight of sulfuric acid for each part by weight of p-quinone has been found particularly preferred). When acetic anhydride is reacted with p-quinone, from about 2.0 to about 5 mols of acetic anhydride can be employed for each mol of p-quinone; most advantageously, about 2.5 mols of acetic anhydride can be employed.

In general, from about 1% to about 100% by weight of a strongly acidic compound can be employed as the catalyst, based on the weight of the starting material.

In carrying out the process of this invention, it is believed that during the initial stage of the reaction, rearrangement and deacetylation of at least one of the hydroxy groups may take place as follows:

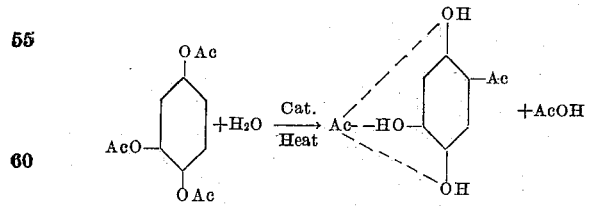

After this partial hydrolysis and rearrangement, it is necessary to subject this intermediate product to hydrolysis by boiling a short time with water in the presence of an acidic catalyst in order to produce the product desired. The catalyst employed for the first stage of the reaction can be advantageously employed to serve this latter purpose quite satisfactorily so that it is only necessary to add water and then reflux the solution for a few minutes to accomplish this second stage comprising the completion of the hydrolysis. In regard to the second stage of the reaction involving the hydrolysis completion, the catalyst employed during the main course of the reaction can be advantageously supplemented by an additional quantity of the same or a different catalyst in order to facilitate the completion of the hydrolysis; however, this is not necessary. In all cases, if the quantity of water employed is approximately equal in mols to the triacetate employed, the product obtained consists of a mixture of 2,4,5-trihydroxyacetophenone and some of its monoacetate. These products can be separated and employed as pure compounds for their antioxidant effect, or the mixture can be employed, since both of these compounds are antioxidants individually. This monoacetate is a valuable food antioxidant for fats and oils; refer to a copending application filed on August 2, 1952 by Bell and Knowles, Serial No. 302,411.

In brief, this invention concerns a process for preparing a nuclearly substituted acyl derivative of a trihydroxybenzene which comprises reacting a triacyloxybenzene wherein each acyl group contains from 2 to 10 carbon atoms with an initially limited quantity (from about 1 to about 2 mol proportions) of a deacylating agent selected from the group consisting of water and lower aliphatic alcohols containing from 1 to 8 carbon atoms in the presence of from about 1% to about 100% of a strongly acidic compound at a temperature of from about 80° C. to about 160° C.

When p-quinone is employed as the starting material, this invention involves a process for preparing a 2,4,5-trihydroxyacylbenzene which comprises reacting p-quinone with from about 2 to about 5 molecular proportions of acetic anhydride at an initial reaction temperature of from about 25° to about 75° C. in the presence of from about 1% to about 20% by weight, based on the weight of the p-quinone of sulfuric acid, then increasing the temperature to from about 80° C. to about 160° C. and adding a limited quantity of a deacylating agent selected from the group consisting of water and lower aliphatic alcohols containing from 1 to 6 carbon atoms.

Purification of the crude product obtained during the course of the reaction, which contains a small quantity of a dark red impurity, can be accomplished by treating an aqueous solution of the reaction product with charcoal or by passing such a solution, either aqueous or in an organic solvent, through a column of an adsorbent material, such as activated alumina or charcoal (see Example A3). Other means for purification can also be advantageously employed in accordance with procedures known to chemists familiar with the art (see Examples B and C).

The following examples 1 through 4 will serve to further illustrate the preparation of 2,4,5-trihydroxyacetophenone in accordance with this invention. Examples 1 through 3 illustrate the preparation of 2,4,5-trihydroxyacetophenone beginning with 1,2,4-triacetoxybenzene, whereas Example 4 illustrates the use of p-quinone as the starting material.

*Example 1.—2,4,5-trihydroxyacetophenone*

A mixture of 12.6 g. (0.05 mol) of 1,2,4-triacetoxybenzene, 9.5 g. (0.05 mol) of p-toluenesulfonic acid monohydrate and 100 ml. of tetrachloroethane was refluxed for one hour. The solvent was removed by steam distillation leaving a residual red solution which deposited 5 g. (60%) of nearly pure 2,4,5-trihydroxyacetophenone when cooled.

The reaction was carried out again as in Example 1, but using benzene as solvent and a reflux period of 18 hr. The yield was identical.

The reaction was run again as in Example 1, but only a trace of p-toluenesulfonic acid monohydrate was used. No 2,4,5-trihydroxyacetophenone was obtained since no substantial quantity of water was present during the initial stage of the reaction.

*Example 2.—2,4,5-trihydroxyacetophenone*

A mixture of 12.6 g. (0.05 mol) of 1,2,4-triacetoxybenzene and 9.5 g. (0.05 mol) of p-toluenesulfonic acid monohydrate was heated at 135–140° C. for 15 minutes. The reaction product was then refluxed in 75 ml. of water for a few minutes and the resulting solution then cooled. A yield of 60% of nearly pure 2,4,5-trihydroxyacetophenone was obtained.

*Example 3.—2,4,5-trihydroxyacetophenone*

A mixture of 126 g. (0.5 mol) of 1,2,4-triacetoxybenzene and 9.5 g. (0.05 mol) of p-toluenesulfonic acid monohydrate was heated, with stirring, to 135° C. While maintaining this temperature, 9 g. (0.5 mol) of water was dropped in over a period of 15 minutes. The reaction mixture was taken up in 500 ml. of water and boiled for 15 minutes to complete the hydrolysis. When cooled, 36 g. (43%) of 2,4,5-trihydroxyacetophenone separated.

The reaction was run again as in Example 3 except that the temperature was 160° C. A yield of 49% was obtained.

The reaction was run again as in Example 3 except that 3 g. of 94% sulfuric acid was used as catalyst rather than p-toluenesulfonic acid monohydrate. Only a small amount of the desired product was obtained. However, this reaction was run again as in Example 3 except that 3 g. of 94% sulfuric acid and 50 ml. of acetic anhydride were used as catalyst rather than p-toluenesulfonic acid monohydrate and the quantity of water was increased to 25 ml. A yield of 23% was obtained.

The reaction was run again as in Example 3 except that 13.6 g. of freshly fused zinc chloride was used as catalyst. A yield of 49% was obtained.

The reaction was run again as in Example 3 except that 45 g. (0.6 mol) of n-butanol was used instead of the water; butyl acetate was formed instead of acetic acid. A yield of 33% was obtained.

*Example 4.—2,4,5-trihydroxyacetophenone*

A solution of 180 g. (1.75 mol) of acetic anhydride and 5 g. of concentrated sulfuric acid was stirred and cooled at 40–50° C. while 60 g. (0.55 mol) of p-quinone was added gradually. After the quinone had been added, the mixture was allowed to cool spontaneously to 35° C. The temperature was then raised to 135° C. and, while stirring, 25–30 ml. of water was dropped in over a period of 15–30 minutes. Acetic acid distilled from the reaction mixture while water was being added. The residue was dissolved in 500 ml. of water and then boiled for a few minutes to complete the hydrolysis. Upon cooling, 49–65 g. (53–70%) of 2,4,5-trihydroxyacetophenone separated.

The reaction was run again as in Example 4 except that the temperature was about 120° C. A yield of 27% was obtained.

The reaction was run again as in Example 4 except that 1 g. of technical p-toluenesulfonic acid was added immediately before the addition of water. A yield of 62% was obtained.

The reaction was run again as in Example 4 except that 1 g. of benzenesulfonic acid was added immediately before the addition of water. A yield of 58% was obtained.

The reaction was run again as in Example 4 except that 1 g. of m-benzenedisulfonic acid was added immediately before the addition of water. A yield of 70% was obtained.

The reaction was run again as in Example 4 except that 1 g. of dl-camphorsulfonic acid was added immediately before the addition of water. The yield was 60%.

The reaction was run again as in Example 4 except that 140 g. (1.38 mol) of acetic anhydride was used. The yields were identical (53–70%).

The reaction was run again as in Example 4 except that 140 g. (1.38 mol) of acetic anhydride was used and the water was added in a period of twenty seconds instead of 15–30 minutes. The yield was 25%.

The following examples illustrate advantageous procedures for purifying 2,4,5-trihydroxyacetophenone.

Example A.—Batchwise purification

An 8–10% hot aqueous solution of crude 2,4,5-trihydroxyacetophenone was treated with decolorizing charcoal and, after a few minutes, filtered. The cooled filtrate deposited light yellow pure 2,4,5-trihydroxyacetophenone. If any red color was left, the process was repeated.

The process of Example A was repeated using activated alumina as the adsorbant. It gave satisfactory results as in Example A.

The process of Example A was repeated using a highly-activated grade of carbon produced from lignite and/or charcoal as the absorbant. It was highly efficient.

Example B.—Chromatographic purification

A hot aqueous solution of crude 2,4,5-trihydroxyacetophenone was passed through a column of activated alumina. A very narrow, dark band formed at the top of the column and the exudate was light yellow and, when cooled, deposited pure product.

Example C.—Chromatographic purification

A hot acetone solution of 2,4,5-trihydroxyacetophenone was passed through a column which was the same as in Example B. A very narrow, dark band formed at the top of the column. The solvent was removed from the exudate by distillation and replaced with hot water. Cooling gave a pure product.

The following example illustrates a modification of this process employing another trihydroxy derivative of benzene in place of the 2,4,5-trihydroxybenzene which was employed in the preceding examples.

Example 5.—Gallacetophenone

Twenty-five grams (0.2 mol) of pyrogallol was covered with 102 g. (1.0 mol) of acetic anhydride and then treated cautiously with 3 g. of concentrated sulfuric acid. As soon as the reaction subsided, 1 g. of m-benzenedisulfonic acid was added and the temperature raised to 135° C. While stirring at this temperature, 15 ml. of water was added dropwise, allowing acetic acid to distill off. The reaction mixture was dissolved in 300 ml. of water and then boiled for several minutes. When cooled, 18 g. (54%) of nearly pure gallacetophenone separated.

What I claim is:

1. A process for preparing a nuclearly substituted mono-acyl derivative of a trihydroxybenzene which comprises first reacting one mole proportion of a triacyloxybenzene wherein each acyl group contains from 2 to 10 carbon atoms with from about 1 to about 2 mole proportions of a deacylating agent selected from the group consisting of water and aliphatic alcohols containing from 1 to 8 carbon atoms in the presence of from about 1% to about 100% of a strong acid based upon the weight of the triacyloxybenzene at a temperature of from about 80° C. to about 160° C. and then adding additional deacylating agent to form the nuclearly substituted monoacyl derivative of a trihydroxybenzene.

2. A process as defined in claim 1 wherein the deacylating agent is water.

3. A process as defined in claim 2 wherein the acyl groups are acetyl groups, the percentage of acid present is from about 1% to about 3%, and the temperature is from about 135° C. to about 160° C.

4. A process for preparing 2,4,5-trihydroxyacetophenone which comprises reacting 1,2,4-triacetoxybenzene with from about 1 to about 2 molecular proportions of water in the presence of from about 1% to about 3% of a strong acid at a temperature of from about 135° C. to about 160° C. and then adding additional water to form 2,4,5-trihydroxyacetophenone.

5. A process as defined in claim 1 wherein the deacylating agent is n-butanol.

6. A process as defined in claim 5 wherein the acyl groups are acetyl groups.

References Cited in the file of this patent

FOREIGN PATENTS 287,967    Great Britain _____ Apr. 2, 1928

OTHER REFERENCES

Bargellini et al.: "Gazette Chem. Ital.," vol. 40, p. 247 (1910).

Healy et al.: "J. Chem. Soc.," p. 1627 (1934).

Vliet: "Organic Synthesis," collected vol. I (1941), p. 317, Wiley & Sons, publishers, New York.